(12) United States Patent
Desrosiers (10) Patent No.: US 8,424,489 B2
(45) Date of Patent: Apr. 23, 2013

(54) DEVICE AND METHOD FOR FEEDING DOMESTICATED ANIMALS

(76) Inventor: Kathleen Desrosiers, Mascouche (CA)

( * ) Notice: Subject to any disclaimer, the term of this patent is extended or adjusted under 35 U.S.C. 154(b) by 216 days.

(21) Appl. No.: 13/054,604

(22) PCT Filed: Jul. 21, 2009

(86) PCT No.: PCT/CA2009/000989
§ 371 (c)(1),
(2), (4) Date: Jan. 18, 2011

(87) PCT Pub. No.: WO2010/009537
PCT Pub. Date: Jan. 28, 2010

(65) Prior Publication Data
US 2012/0204799 A1 Aug. 16, 2012

Related U.S. Application Data

(60) Provisional application No. 61/082,240, filed on Jul. 21, 2008.

(51) Int. Cl.
*A01K 5/01* (2006.01)
*B65D 73/00* (2006.01)

(52) U.S. Cl.
USPC ........ 119/61.54; 206/457; 220/507; 221/122; 119/63; 119/61.5

(58) Field of Classification Search ............... 119/51.01, 119/51.02, 51.11, 51.12, 51.13–51.15, 61.1–63, 119/61.3–61.31, 61.5–61.57, 900; D30/121, D30/122, 129, 130; 206/457, 533; 221/121, 221/122, 123, 89–91, 133; 446/236, 489; 222/144, 144.5, 142.9; 220/507, 523–525
See application file for complete search history.

(56) References Cited

U.S. PATENT DOCUMENTS

| 83,695 | A | * | 11/1868 | Crane ........................... 220/525 |
| D39,506 | S | | 9/1908 | Herbert |
| 2,492,604 | A | * | 12/1949 | Townsend ....................... 119/72 |
| 2,528,742 | A | | 11/1950 | Coffing |
| D185,873 | S | * | 8/1959 | Bergeron ....................... D7/555 |
| 3,180,316 | A | * | 4/1965 | Chatfield et al. ........... 119/51.12 |
| 3,204,608 | A | | 9/1965 | Snitz |
| 3,648,403 | A | | 3/1972 | Gommel |
| 4,249,483 | A | | 2/1981 | Sobky |
| 4,267,799 | A | | 5/1981 | Bacon |

(Continued)

FOREIGN PATENT DOCUMENTS

| AU | 571055 B2 | 3/1988 |
| AU | 592292 B3 | 1/1990 |

(Continued)

*Primary Examiner* — Andrea Valenti
(74) *Attorney, Agent, or Firm* — IPAXIO S.E.N.C.

(57) ABSTRACT

The device comprises a first food-receiving portion provided within an upper side of a main body The first portion comprises independent first food compartments disposed in axi-symmetrical positions with reference to a central vertical axis A first cover having at least one access aperture is positioned over the first portion and is supported for free rotation upon actuation by the animal being fed Independent second food-receiving portions, each comprising two second food compartments separated from one another by a transversal wall, are provided adjacent to the first portion Each second portion has a corresponding second cover that is in sliding engagement therewith and freely movable upon actuation by the animal being fed The combination of rotating and sliding covers create stimulating challenges for the animal.

20 Claims, 12 Drawing Sheets

U.S. PATENT DOCUMENTS

| | | | |
|---|---|---|---|
| 4,450,790 A | 5/1984 | Stansbury et al. | |
| 4,671,210 A | 6/1987 | Robinson et al. | |
| 4,722,299 A | 2/1988 | Mohr | |
| 4,805,560 A | 2/1989 | Knego et al. | |
| 4,823,738 A | 4/1989 | Gold | |
| D311,310 S | 10/1990 | Clivio | |
| D317,666 S | 6/1991 | Haynes | |
| D321,788 S | 11/1991 | Chen | |
| D326,743 S | 6/1992 | Haynes | |
| 5,133,292 A | 7/1992 | Kirk | |
| 5,150,664 A | 9/1992 | Kirk | |
| 5,176,103 A | 1/1993 | Reid et al. | |
| D335,370 S | 5/1993 | Kirk | |
| 5,222,461 A | 6/1993 | Haynes | |
| D339,429 S | 9/1993 | Reid et al. | |
| 5,377,620 A * | 1/1995 | Phillippi | 119/51.12 |
| 5,536,007 A | 7/1996 | Snyder | |
| 5,546,894 A | 8/1996 | St-Pierre | |
| D378,869 S | 4/1997 | Mikell | |
| 5,649,499 A | 7/1997 | Krietzman et al. | |
| D391,363 S | 2/1998 | Rohrig | |
| D393,934 S | 4/1998 | Harvey | |
| D397,740 S | 9/1998 | Georgevich | |
| D399,570 S | 10/1998 | Chen | |
| D405,565 S | 2/1999 | Price | |
| 5,947,061 A | 9/1999 | Markham et al. | |
| 5,950,567 A | 9/1999 | Sheaffer et al. | |
| 5,975,024 A | 11/1999 | Sheaffer | |
| D420,447 S | 2/2000 | Rohrig | |
| 6,032,615 A | 3/2000 | Girard | |
| D427,384 S | 6/2000 | Baillargeon | |
| 6,073,581 A | 6/2000 | Wang | |
| 6,138,831 A * | 10/2000 | Agostinelli | 206/541 |
| D447,074 S | 8/2001 | Chan | |
| D449,893 S | 10/2001 | Chen | |
| 6,341,578 B1 | 1/2002 | Bérubé | |
| D457,989 S | 5/2002 | O'Rourke | |
| 6,526,912 B1 | 3/2003 | Ottoson | |
| D477,371 S | 7/2003 | Niu | |
| 6,622,656 B1 | 9/2003 | Splane | |
| D481,834 S | 11/2003 | O'Rourke | |
| 6,640,750 B2 | 11/2003 | Rowe et al. | |
| 6,666,167 B1 | 12/2003 | Carlson | |
| 6,945,195 B1 | 9/2005 | Morrison | |
| D513,236 S | 12/2005 | Hunt et al. | |
| D515,515 S | 2/2006 | Li | |
| D520,677 S | 5/2006 | Xu | |
| 7,111,581 B2 | 9/2006 | Kubala et al. | |
| D531,364 S | 10/2006 | Crane | |
| D547,145 S | 7/2007 | Shan | |
| 7,246,574 B2 | 7/2007 | Renforth | |
| D549,529 S | 8/2007 | Risch et al. | |
| D550,551 S | 9/2007 | Howard | |
| 7,263,953 B2 | 9/2007 | Sundararajan | |
| D557,750 S | 12/2007 | Monzo | |
| D562,503 S | 2/2008 | Zutis et al. | |
| D572,141 S | 7/2008 | Slabaugh | |
| D589,768 S | 4/2009 | Henderson | |
| D591,162 S | 4/2009 | Slabaugh | |
| 7,513,220 B2 | 4/2009 | Ragonetti et al. | |
| D591,478 S | 5/2009 | Slusarczyk et al. | |
| D602,656 S | 10/2009 | Fuhrer | |
| 7,600,488 B2 | 10/2009 | Mann | |
| 7,631,613 B2 | 12/2009 | Lescroart | |
| D614,818 S | 4/2010 | Moore et al. | |
| 2004/0134434 A1 | 7/2004 | Kraft et al. | |
| 2005/0224003 A1 | 10/2005 | Yin et al. | |
| 2008/0060583 A1 | 3/2008 | Liberto | |
| 2008/0289580 A1 | 11/2008 | Krishnamurthy | |
| 2009/0056640 A1 | 3/2009 | Gross | |

FOREIGN PATENT DOCUMENTS

| | | |
|---|---|---|
| CN | 201004895 Y | 1/2008 |
| DE | 20219528 U1 | 4/2003 |
| FR | 2574622 A1 | 6/1986 |
| GB | 201365 A | 8/1923 |
| GB | 423080 A | 1/1935 |
| GB | 1546638 A | 5/1979 |
| GB | 2347062 A | 8/2000 |
| SE | 520848 C2 | 9/2003 |
| SE | 524376 C2 | 8/2004 |
| SE | 0302480 A | 3/2005 |
| WO | 20060060553 A2 | 6/2006 |
| WO | 20080110164 A2 | 9/2008 |
| WO | 20090078788 A1 | 6/2009 |
| WO | 2010009537 A1 | 1/2010 |

* cited by examiner

DEVICE AND METHOD FOR FEEDING DOMESTICATED ANIMALS

CROSS-REFERENCE TO RELATED APPLICATIONS

This application is a national stage filing under Section 371 of International Patent Application No. PCT/CA2009/000989, filed on 21 Jul. 2009 and published in English as WO 2010/009537 A1 on 28 Jan. 2010. PCT/CA2009/000989 claims priority to U.S. Provisional Patent Application Ser. No. 61/082,240 filed on 21 Jul. 2008. The entire contents of PCT/CA2009/000989 and U.S. Provisional Patent Application No. 61/082,240 are incorporated herein by reference in their entirety.

TECHNICAL FIELD

The technical field generally relates to devices and methods for dispensing measured quantities of food to domesticated animals and providing them with a stimulating challenge while they eat.

The technical field also generally relates to devices capable of being used as a food bowl while creating a playful activity for an animal, for example a pet, during its meal.

BACKGROUND

In the wild, animals find their own food and often need to do some tasks with the food they found before eating. Wild animals thus have some challenges that they need to overcome before eating some food. Most domesticated animals, however, have no significant challenge to overcome before eating since they are generally fed by humans. Food presented to them is often preprocessed and often needs no intervention from the animal before eating. Nevertheless, domesticated animals still have different basic food-related instincts that were essential to the survivals of their ancestors in the wild. These basic food-related instincts are often never entirely suppressed. They can result in some behaviors that are generally undesirable for most owners or caretakers of domesticated animals, depending on the kind of animal and where the animal lives. For example, in the case of pets such as cats or dogs, these behaviors can include damaging furniture or personal objects while simulating hunting or food processing. They can even include chasing or hunting smaller backyard animals. People are thus constantly looking for suitable stimulating challenge's that can mitigate some of the basic food-related instincts of domesticated animals.

Furthermore, some domesticated animals have a tendency of eating food too quickly when the food is just simply presented to them, for instance using a classic animal food bowl or the like. Eating food too quickly can have undesirable consequences for the animal, such as digestive problems, vomiting, gases, etc. An abnormally-fast eating can also cause some animals to eat more food than they actually need before reaching the point of satiety. These animals can become overweight after a given time and develop related health problems. For some other domesticated animals, the absence of a stimulating challenge at the time of their meal makes them to eat less food than their body actually needs. Eating less food than required can also cause health problems over time.

Many arrangements that can provide a measured quantity of food to domesticated animals have been proposed over the years. Some were aimed at automatically providing food at predetermined time intervals, for instance once each day, during the absence of their owners or caretakers. Examples of such arrangements are presented in U.S. Pat. No. 4,450,790 granted on 29 May 1984, French Patent Application No. 2 574 622 published on 20 Jun. 1986, U.S. Design Pat. No. 335,370 granted on 4 May 1993, U.S. Design Pat. No. 339,429 granted on 14 Sep. 1993, and European Patent No. 0 505 049 B1 granted on 11 Jan. 1995. Other arrangements include some form of actuation by the animals. Examples of such arrangements are presented in U.S. Pat. No. 3,204,608 granted on 7 Sep. 1965, U.S. Pat. No. 4,823,738 granted on 25 Apr. 1989, U.S. Pat. No. 5,150,664 granted on 29 Sep. 1992, PCT Publication NO WO 97/05770 published on 20 Feb. 1997, and U.S. Pat. No. 7,111,581 granted on 26 Sep. 2006. However, the relative complexity of these various arrangements often creates many difficulties in terms of manufacturability, dependability and overall costs of the final products.

Arrangements designed to slow down the ingestion of food by animals have also been presented in the past. One example if U.K. Patent No. 423,080 granted 24 Jan. 1935. Such arrangement included a concave plate having holes or large perforations therein and provided with a rail or rim. The plate is placed over the animal's food in a container and rests on the food. The food comes up through the holes or perforations or over the edge of the plate. This arrangement prevents the animal from bolting its food.

PCT Publication No. WO 2009/078788 published on 25 Jun. 2009 discloses a pet game board and board game. This arrangement, however, is designed to provide rewards to pets in the form of treats. It is not designed to provide a complete meal to the animals.

None of the arrangements suggested in the past was found to be completely satisfactory for providing a stimulating challenge to domesticated animals when they eat their meal. Clearly, room for improvements still exists in the area.

SUMMARY

In one aspect, there is provided a food dispensing and stimulating device for a domesticated animal, the device comprising: a main body; a first food-receiving portion provided within an upper side of the main body, the first portion comprising a plurality of independent first food compartments disposed in axisymmetrical positions with reference to a central vertical axis, each first food compartment having a closed bottom side and an opened upper side; a first cover positioned over the first portion and supported for free rotation with reference to the vertical axis of the first portion upon actuation by the animal being fed, the first cover including a wall having at least one access aperture; a plurality of independent second food-receiving portions provided within the upper side of the main body adjacent to the first portion, each second portion comprising two second food compartments separated from one another by a transversal wall, each second food compartment having a closed bottom side and an opened upper side; and a plurality of second covers, each second cover positioned over a corresponding one of the second portions and freely slidable upon actuation by the animal being fed between a first position where one of the second food compartments is substantially entirely covered, and a second position where the other of the second food compartments is substantially entirely covered.

In another aspect, there is provided a combination pet food bowl and activity center comprising: a body having a plurality of compartments divided into radial compartments and split compartments; the split compartments being characterized by having a partition subdividing each split compartment into at least two sub compartments; a sliding cover on each split compartment to allow for partial access to only one subdivision on any given split compartment; a rotating cover rotating around an axis to cover all of the radial compartments; and an opening allowing access to one radial compartment at a time.

In another aspect, there is provided a method for simultaneously feeding and stimulating a domesticated animal, the method comprising: placing food in at least one of several first food compartments disposed in circle; placing food in at least one of several second food compartments located adjacent to the first food compartments; hiding at least a major part of the food in the first food compartments using a rotatable cover; hiding at least some of the food in the second food compartments using slidable covers; and presenting the first and second food compartments to the domesticated animal, the animal moving the rotatable cover and the sliding covers itself to gain access to only some of the first and second food compartments at a time.

In another aspect, there is provided a method for simultaneously feeding and stimulating a domesticated animal, the method comprising: placing some food in a first food-receiving portion of a device, the first portion requiring the animal to rotate an element to gain access to all the food therein; and placing some food in a plurality of second food-receiving portions of the device, the second portions requiring the animal to slide elements to gain access to all the food therein, the second portions being adjacent to the first portion of the device.

In another aspect, there is provided a method of manufacturing a device for simultaneously feeding and stimulating a domesticated animal, the method comprising: forming a plurality of first food compartments disposed in circle and a plurality of independent second food compartments located adjacent to the first food compartments over a main body of the device; forming a rotatable cover for hiding the first food compartments, the rotatable cover having at least one access aperture providing only a partial access to the hidden first food compartments; forming a plurality of slidable covers for hiding a portion of the second food compartments; mounting the rotatable cover for rotation around over the first food compartments; and mounting the slidable covers for translation over a corresponding one of the second food compartments.

Further details on these aspects as well as other aspects of the proposed concept will be apparent from the following detailed description and the appended figures.

DETAILED DESCRIPTION

Figure 1:
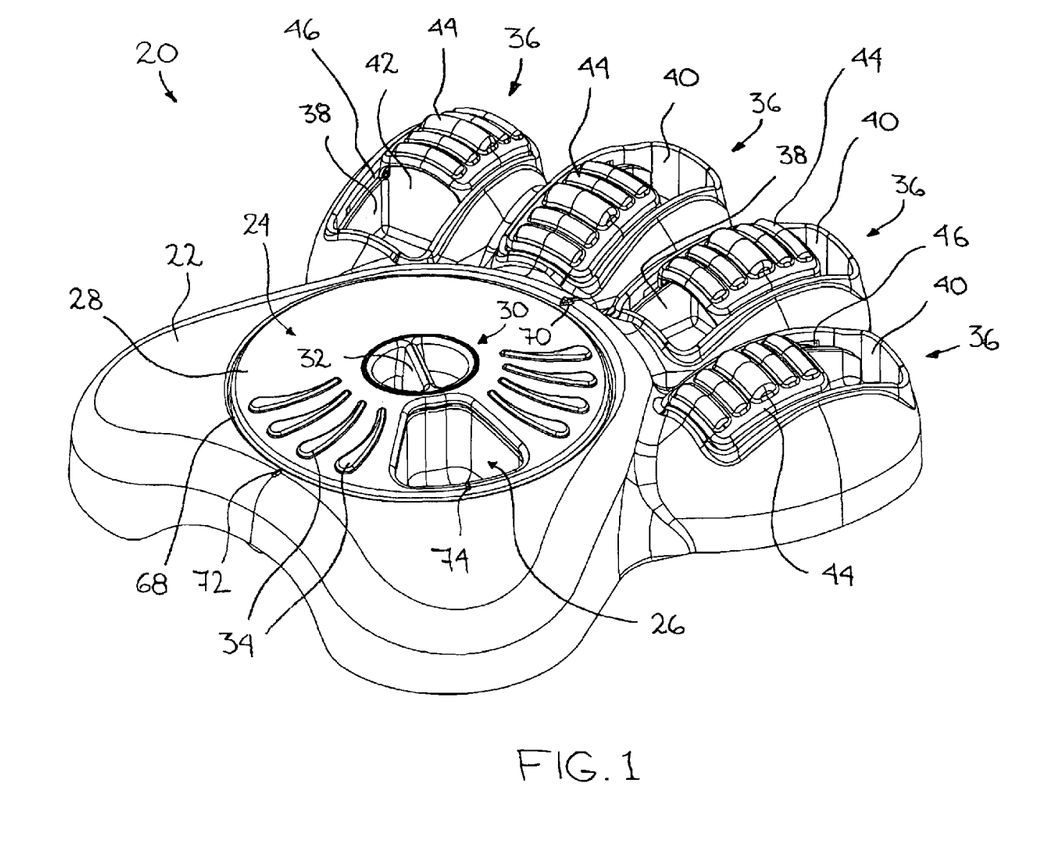
FIG. 1 is an isometric view showing an example of a food dispensing and stimulating device for a domesticated animal.

FIG. 1 is an isometric view showing an example of a food dispensing and stimulating device 20 for a domesticated animal. The domesticated animal can be a domestic animal, for instance a pet such as a cat or a dog. The device can also be designed for many other domesticated animals, including small domesticated animals such as rodents or ferrets, and large domesticated animals such as lamas or horses. Many other kinds of domesticated animals can benefit from the concept presented herein. The expression "domesticated animal" and "domesticated animals" include any animal fed by human on a regular basis. For example, it includes animals living in zoos or the like. Accordingly, although the appended figures show examples that were primarily designed for pets such as cats or dogs, it must be understood that the present concept is not limited to the illustrated examples or to devices and methods concerning only these two kinds of domesticated animals.

The illustrated example of the device 20 is entirely made of a molded plastic, for instance polypropylene. Other kinds of plastics can also be used. Plastics offer many advantages in terms of manufacturability, overall costs and easiness of cleaning. Nevertheless, other materials, for instance a metal, can be used for some or all of the elements of the device 20.

Figure 2:
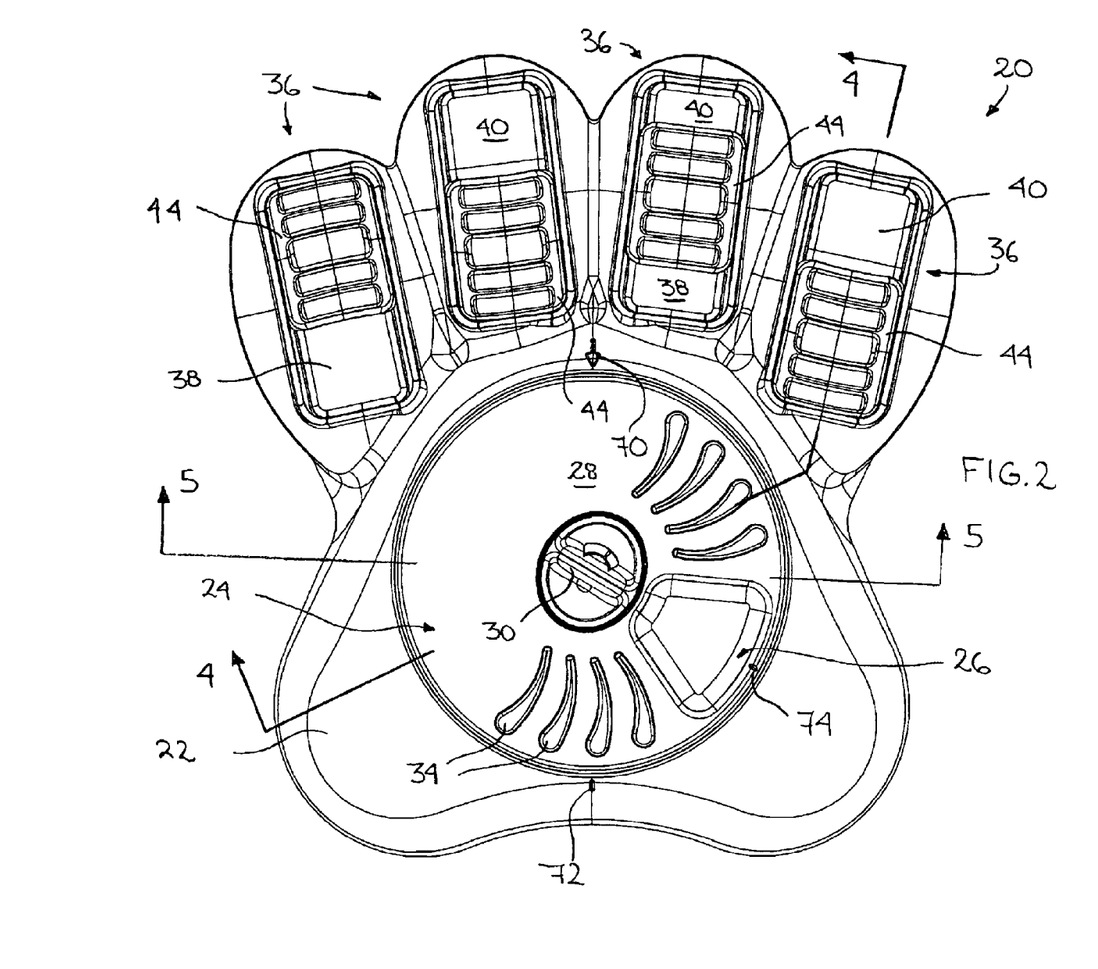
FIG. 2 is an upper plan view of the device shown in FIG. 1.

FIG. 1 shows the device 20 once assembled. FIG. 2 is an upper plan view of the device 20 shown in FIG. 1.

The device 20 comprises a main body 22. When the main body 22 of the illustrated example is viewed from above as in FIG. 2, the contour of its upper side has a shape that looks somewhat similar to a footprint left by the paw of a mammal, for instance a bear. The main body 22 has a bottom side designed to be put on a generally horizontal surface, for instance on the ground. Of course, other designs and configurations are possible.

The device 20 comprises a first cover 24 under which are located a first food-receiving portion 26 provided within the upper side of the main body 22. The first cover 24 is supported for free rotation in any direction with reference to a vertical axis upon actuation by the animal being fed. The animal can use its nose, paws, claws, etc., to rotate the first cover 24. The first cover 24 of the illustrated example has a somewhat dome-shaped upper wall 28 and a circular periphery. Other shapes and configurations are also possible.

The illustrated example further comprises a handle 30 formed by a medial wall 32 extending across a central hollow section of the first cover 24. The medial wall 32 divides the space into two subsections. These subsections are designed to accommodate the fingers of the human user. The first cover 24 of the illustrated example also comprises a plurality of spaced-apart elongated projections 34 that are made integral with the upper surface of the dome-shaped wall 28. These projections 34 provide additional points of contact that can facilitate the actuation of the first cover 24 by the animal. Other configurations and designs are possible.

The device 20 further comprises a plurality of independent second portions 36 provided within the upper side of the main body 22. The second portions 36 are adjacent to the first portion 26. Four identical second portions 36 are included in the illustrated example and each of them corresponds to one digital section of the paw footprint shape of the main body 22.

Each second portion 36 comprises two food compartments 38, 40 separated from one another by a transversal dividing wall 42. The second portions 36 also have a generally rectangular shape. Each of the food compartments 38, 40 of the second portions 36 has a closed bottom side and an opened upper side. The various walls of the second portions 36 are made integral with the main body 22 in the illustrated example. Other configurations, shapes and constructions can be used as well. For instance, the number of second portions 36 can be different than four, two being the minimum. The second portions 36 may be oriented or located differently. Their shape may be different from a rectangle and the various second portions 36 do not necessarily need to be identical to one another.

Each of the second portions 36 has a respective second cover 44 that is freely slidable upon actuation by the animal being fed. Each second cover 44 can be toggled by the animal between a first position where one of the food compartments 38, 40 is substantially entirely covered, and a second position where the other of the food compartments 38, 40 is substantially entirely covered. The second covers 44 are also allowed to remain in any position between these two limit positions. The second covers 44 are shown in various positions in FIGS. 1 and 2. The second covers 44 are slidably engaged in slots 46 provided on the sides of the second portions 36, as explained later in the text. Some of these slots 46 are visible in FIG. 1.

Figure 3:
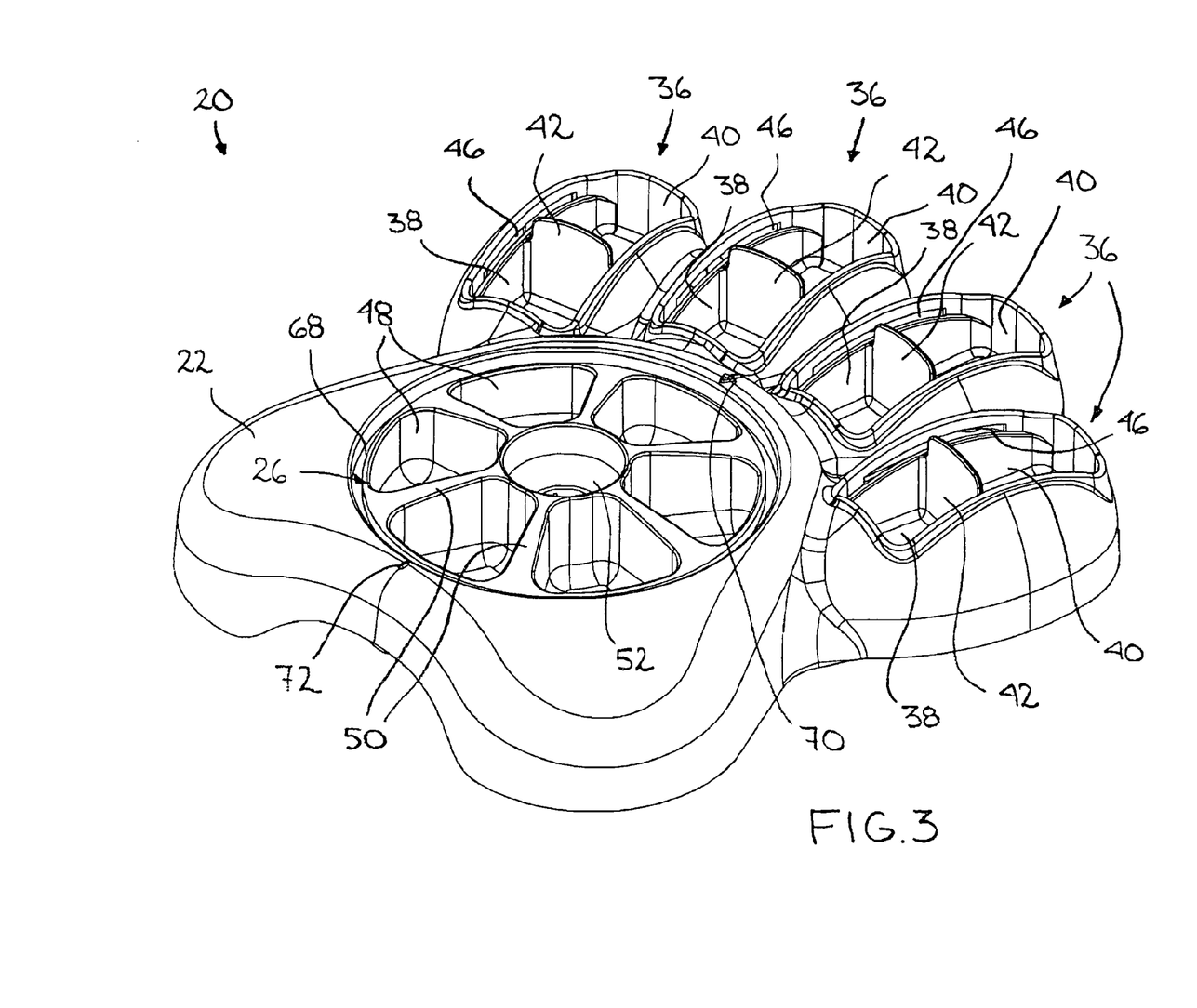
FIG. 3 is a view similar to FIG. 1 but shows the device without the covers.

FIG. 3 is a view similar to that of FIG. 1 but shows the device 20 without the first cover 24 and the second covers 44. FIG. 3 shows that the first food-receiving portion 26 of the device 20 comprises a plurality of independent food compartments 48 disposed at axisymmetrical positions with reference to the central vertical axis around which the first cover 24 rotates. Six identical food compartments 48 are provided in the illustrated example. Each food compartment 48 has a closed bottom side and an opened upper side. The food compartments 48 are connected to one another by a plurality of intermediate upper wall members 50 closing the space between adjacent food compartments 48 on the upper side of the device 20. The upper wall members 50, on their inner radial side, are made integral with a substantially cup-shaped wall 52 surrounding the center of the first portion 26. The cup-shaped wall 52 has an opened upper side, a smooth interior surface and a central bottom opening. The various walls of the first portion 26 are made integral with the main body 22 in the illustrated example. Thus, in this illustrated example, the main body 22, the first portion 26 and the second portions 36 form a monolithic one-piece unit.

Figure 4:
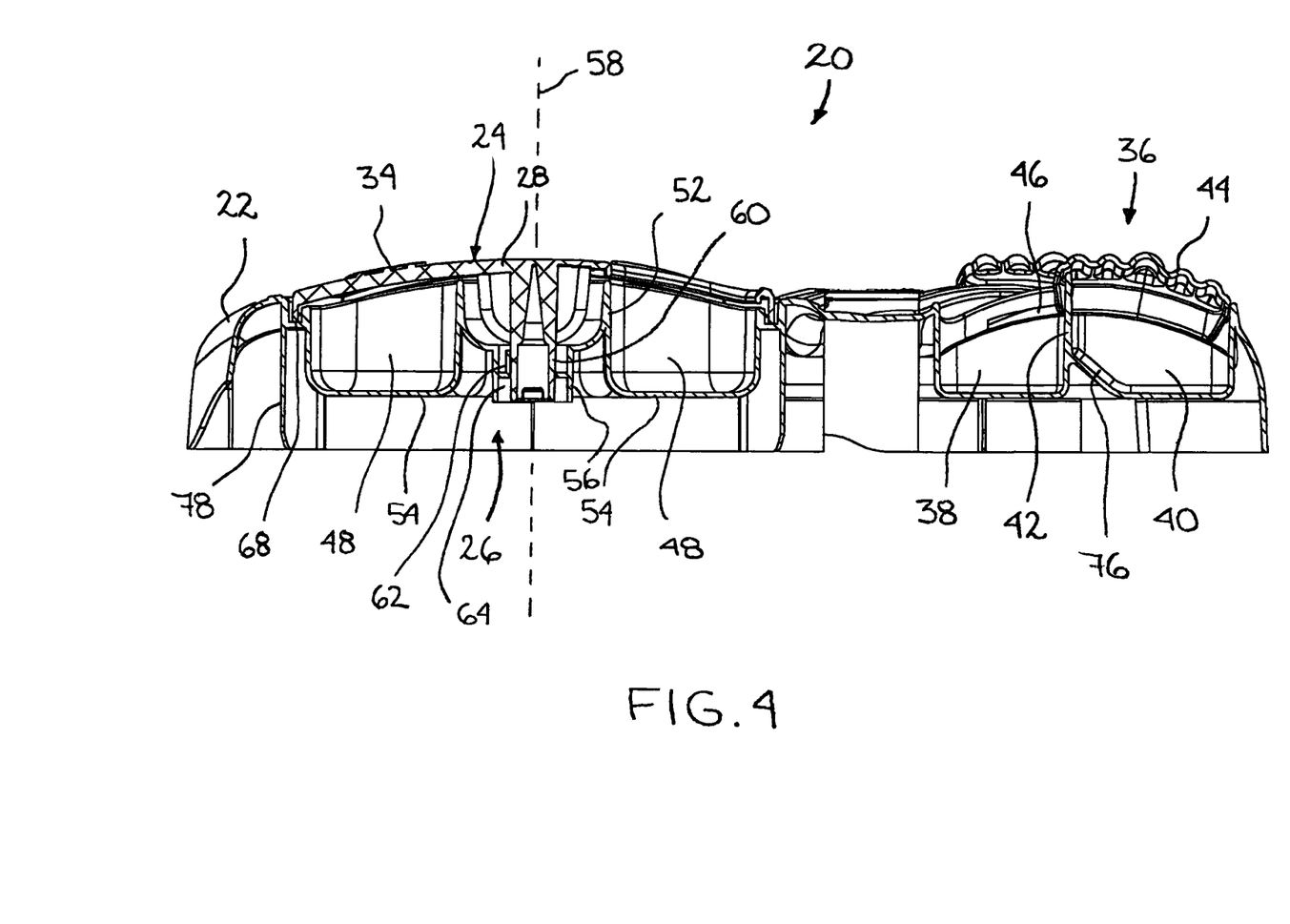
FIG. 4 is a cross-sectional view of the device taken according to line 4-4 in FIG. 2.
Figure 5:
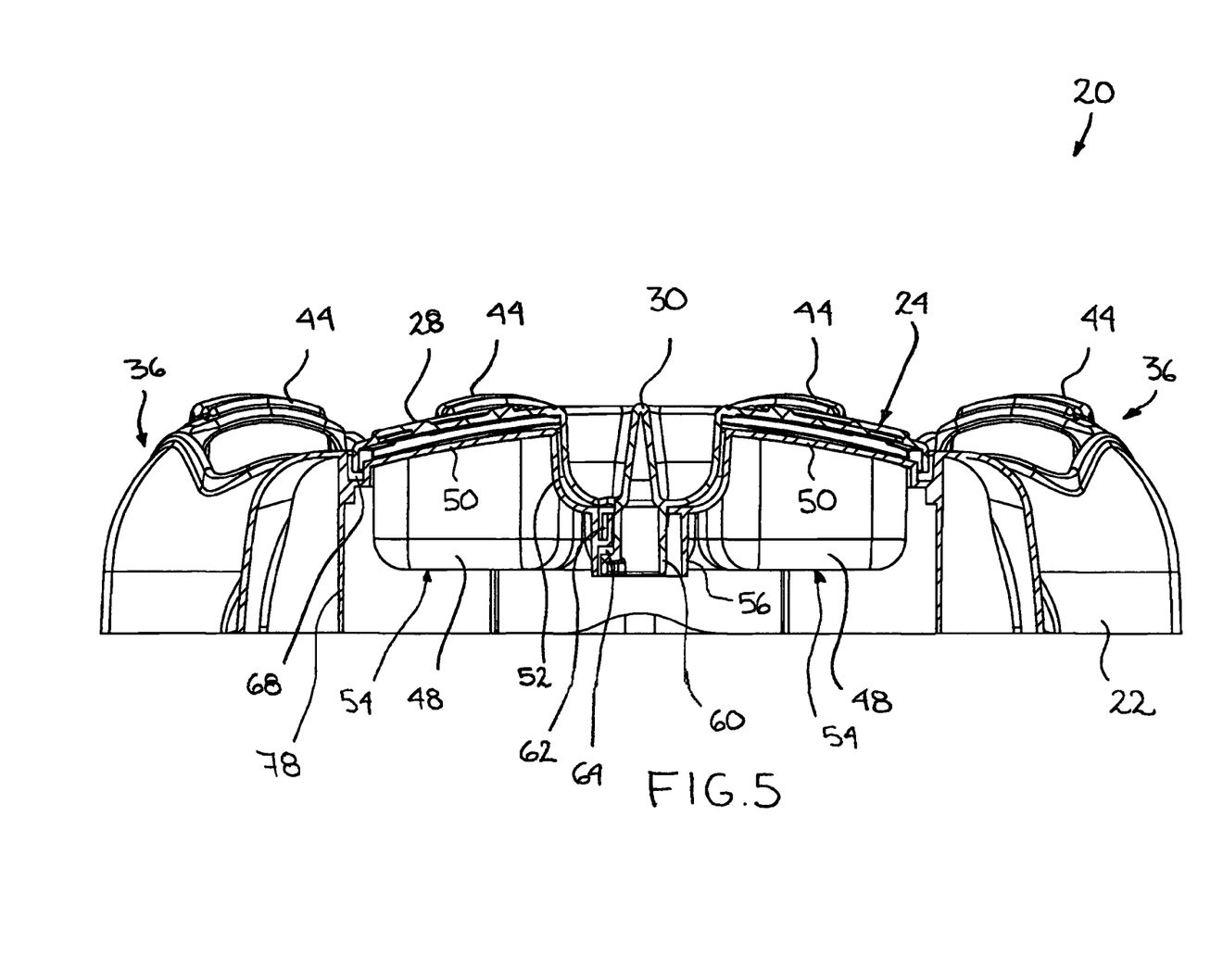
FIG. 5 is a cross-sectional view of the device taken according to line 5-5 in FIG. 2.
Figure 6:
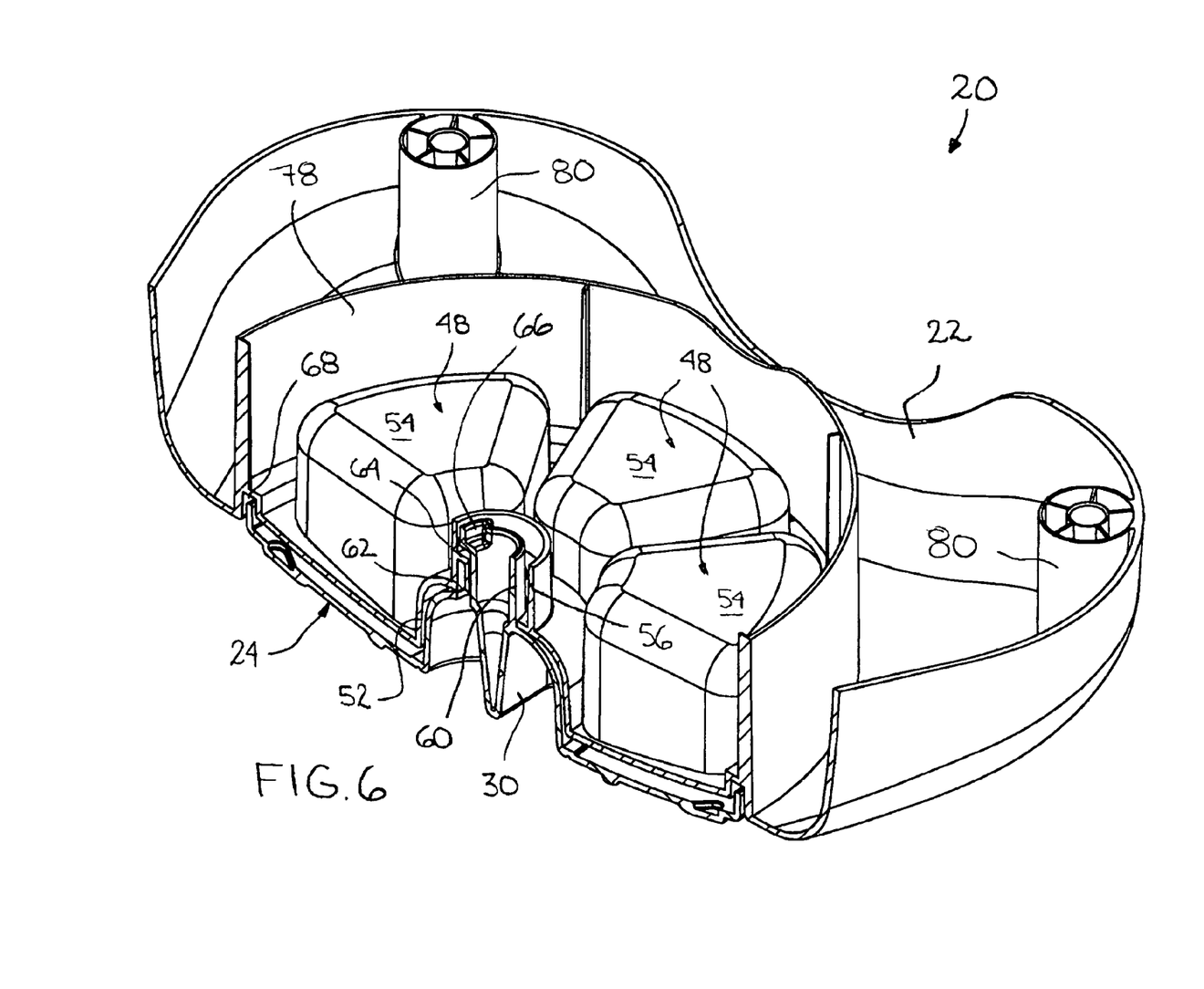
FIG. 6 is an isometric view illustrating the bottom side of the device as shown in FIG. 1.

FIG. 4 is a cross-sectional view of the device 20 taken according to line 4-4 in FIG. 2. FIG. 5 is a cross-sectional view of the device 20 taken according to line 5-5 in FIG. 2. FIG. 6 is an isometric view illustrating the bottom side of the device 20 as shown in FIG. 5. These figures show the flat bottom wall 54 of the food compartments 48 of the first portion 26 in the illustrated example. These bottom walls 54 are made integral with corresponding side walls to form the food compartments 48.

As shown in FIG. 4, the illustrated device 20 comprises a cylindrical wall 56 that is made integral with the bottom side of the cup-shaped wall 52 of the first portion 26. The cylindrical wall 56 is coaxially disposed with reference to the central vertical axis of the first portion 26. This central vertical axis is shown in FIG. 4 at 58. The central bottom opening of the cup-shaped wall 52 and the interior of the cylindrical wall 56 form a vertical passage designed to receive a central axle 60 projecting under the first cover 24.

In the illustrated example, the periphery of this vertical passage is designed with a restraining arrangement capable of preventing the first cover 24 from being easily removed from the device 20 by the animal. It also mitigates the probabilities of losing or dropping the first cover 24 while the device 20 is stored or manipulated. The arrangement comprises two vertically spaced and offset keyways 62, 64. A side protrusion 66 is provided at the free end of the axle of the first cover 24. With the upper keyway, the axle 60 and its protrusion 66 can only be vertically inserted when the protrusion 66 is at a certain angular position around the central vertical axis 58 (FIG. 4). The axle 60 and its protrusion 66 can then be inserted halfway through the vertical passage. Once at the bottom of the upper keyway 62, the protrusion 66 rests on an upper shoulder of the bottom keyway 64, preventing the axle 60 from being inserted further downwards into the vertical passage. The first cover 24 needs be angularly repositioned because the two keyways 62, 64 are angularly offset.

Once the protrusion 66 of the axle 60 has the proper angular position to be in registry with the side slot of the bottom keyway 64, the axle 60 and it protrusion 66 can move downwards until the bottom side of the first cover 24 engages a circular slot 68 provided between the main body 22 and the first portion 26. At that point, the protrusion 66 of the axle 60 is out of the side slot of the bottom keyway 64. The first cover 24 is then free to rotate around the central vertical axis 58. However, the first cover 24 cannot be significantly lifted from the device 20 unless it has the proper angular position to bring again the protrusion 66 in registry with the side slot of the bottom keyway 64. If the protrusion 66 does not have the proper angular position, it will engage a bottom shoulder of the bottom keyway 64. Positing marks 70, 72, and 74 can be provided on the main body 22 and the upper surface of the dome-shaped wall 28 of the first cover 24 to show these various angular positions.

To remove the first cover 24, the protrusion 66 has to go through the two keyways 62, 64 in the reverse direction. First, the protrusion 66 is brought into alignment with the side slot of the bottom keyway 64. Secondly, the first cover 24 is pulled upwards until the protrusion 66 engages a bottom shoulder of the upper keyway 62. Thirdly, the whole first cover 24 is rotated until the protrusion 66 is brought into alignment with the side slot of the upper keyway 62. The first cover 24 can then be pulled upwards and removed from the device 20.

FIG. 4 further shows that in the illustrated example, the two food compartments 38, 40 of each second portion 36 have a slightly different shape. In this design, the length of each second cover 44 along their major axis is longer than half the distance along which the second cover 44 can slide. The food compartment 38 that is closer to the first portion 26 is designed to be fully opened when the second cover 44 is located at the opposite end. When the second cover 44 is covering the food compartment 38, a small upper area of the other food compartment 40 remains at least partially covered in the region adjacent to the transversal wall 42. Nevertheless, food inside the food compartment 40 can be easily accessed by the animal and to further facilitate this access, an inclined wall 76 prevents food from accumulating at the bottom corner adjacent to the transversal wall 42.

As shown in FIGS. 4 to 6, the main body 22 of the illustrated example includes a circular bottom wall 78 surrounding the bottom side of the first portion 26. This circular wall 78 provides some reinforcement to the device 20 and may engage the ground if an excessive force is applied over the device 20. The upper end of the circular wall 78 is adjacent to the circular slot 68 formed between the main body 22 and the first portion 26. FIG. 6 also shows two of the cylindrical members 80 projecting from the bottom of the main body 22 of the illustrated example. Four of these members 80 are provided in the illustrated example. Friction pads (not shown) can be connected to the free end of the members 80.

Figure 7:
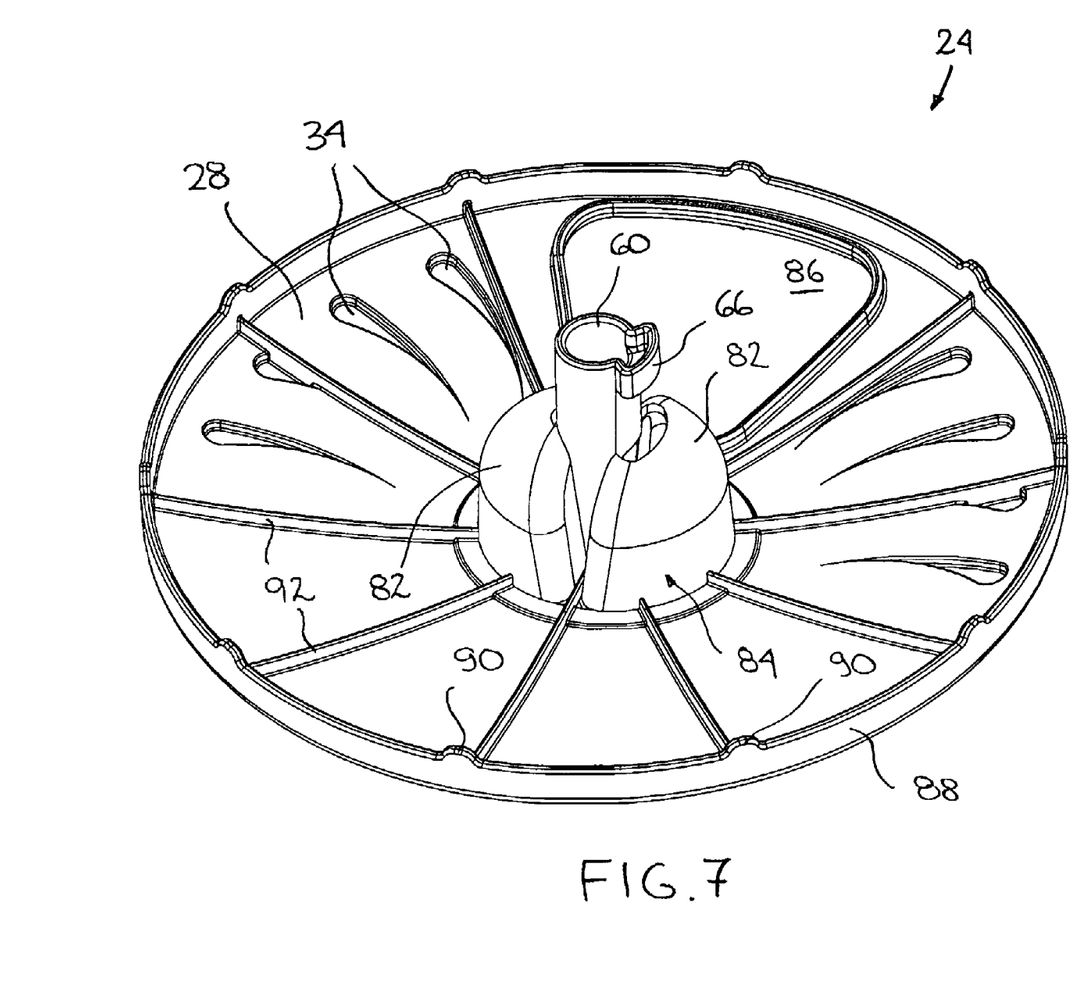
FIG. 7 is an isometric view showing the bottom side of the first cover of the device shown in FIG. 5.
Figure 8:
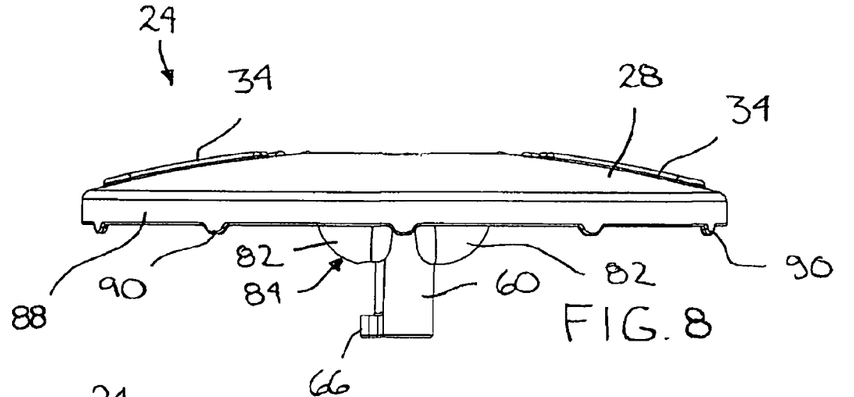
FIG. 8 is a bottom plan view of the first cover of FIG. 7.
Figure 9:
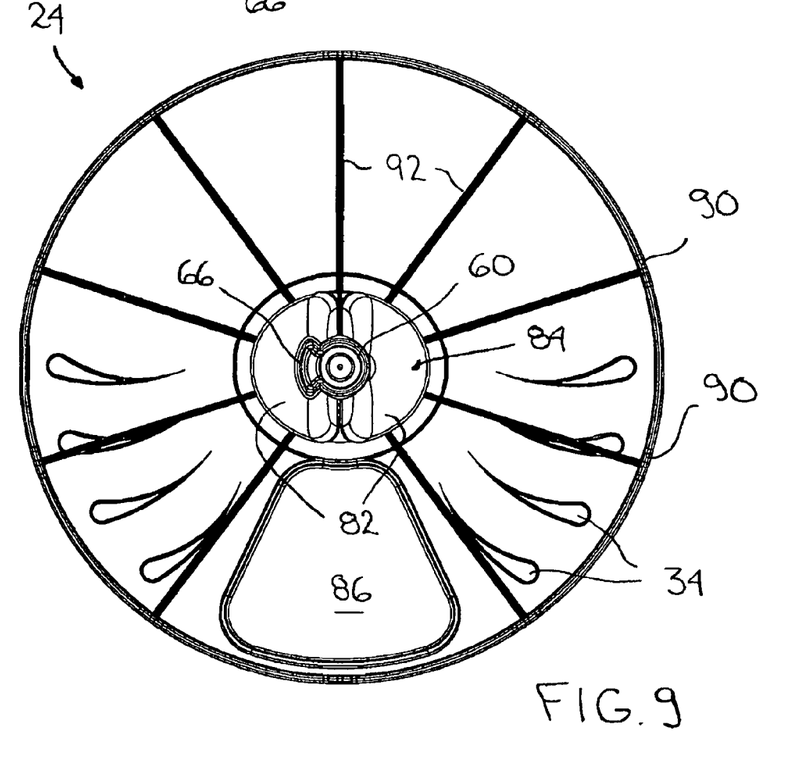
FIG. 9 is a side elevation view of the first cover of FIG. 7.

FIG. 7 is an isometric view showing the bottom side of the first cover 24. As aforesaid, the first cover 24 is positioned over the first portion 26 and is supported for free rotation with reference to the central vertical axis 58 (FIG. 4) of the first portion 26 upon actuation by the animal being fed. FIGS. 8 and 9 are respectively a bottom plan view and a side elevation view of the first cover 24 of FIG. 7.

As shown in FIGS. 7 to 9, the outer bottom surfaces 82 of the hollow section 84 forming the handle 30 at the center of the first cover 24 are somewhat rounded and smooth. These surfaces 82 cooperate with the interior surface of the cup-shaped wall 52 of the first portion 26. The surfaces 82 are thus designed to be axisymmetric with reference to the central vertical axis 58 of the first portion 26 once the device 20 is assembled. The axle 60 of the first cover 24 projects from the bottom of the central section 84.

The first cover 24 includes one or more access apertures 86. In the illustrated example, a single access aperture 86 is provided and this aperture 86 substantially corresponds in size and shape to the opened upper side of each food compartment 48 of the first portion 26. Once registered with one of these food compartments 48 of the first portion 26, the aperture 86 will give the animal full access to food therein while the other food compartments 48 are closed. The aperture 86 also spans two of the food compartments 48 at various angular positions.

FIGS. 7 to 9 further show that the first cover 24 includes a circular bottom flange 88 projecting from the bottom side of the periphery of the dome-shaped wall 28. The bottom edge of this circular flange 88 includes a plurality of spaced-apart individual projections 90 provided for engagement with the bottom of the circular slot 68 surrounding the first portion 26. Reinforcing ribs 92 are also visible underneath the bottom surface of the dome-shaped wall 28 of the illustrated example.

The projections 34 over the upper surface of the dome-shaped wall 28 are visible in FIGS. 7 to 9. FIG. 7 shows that these projections 34 are embossed within the dome-shaped wall 28.

Figure 10:
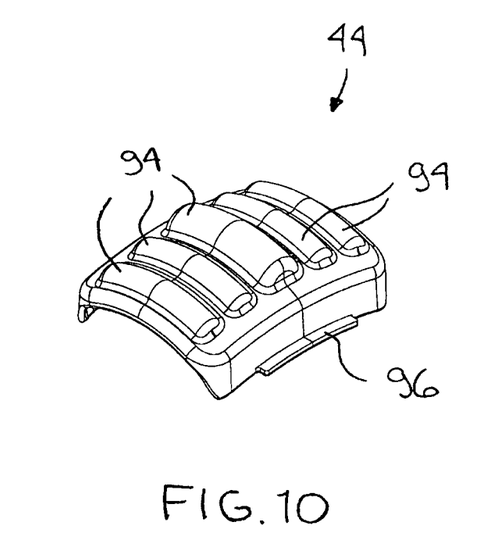
FIG. 10 is an isometric view showing one of the second covers of the device in FIG. 1.
Figures 11, 12:
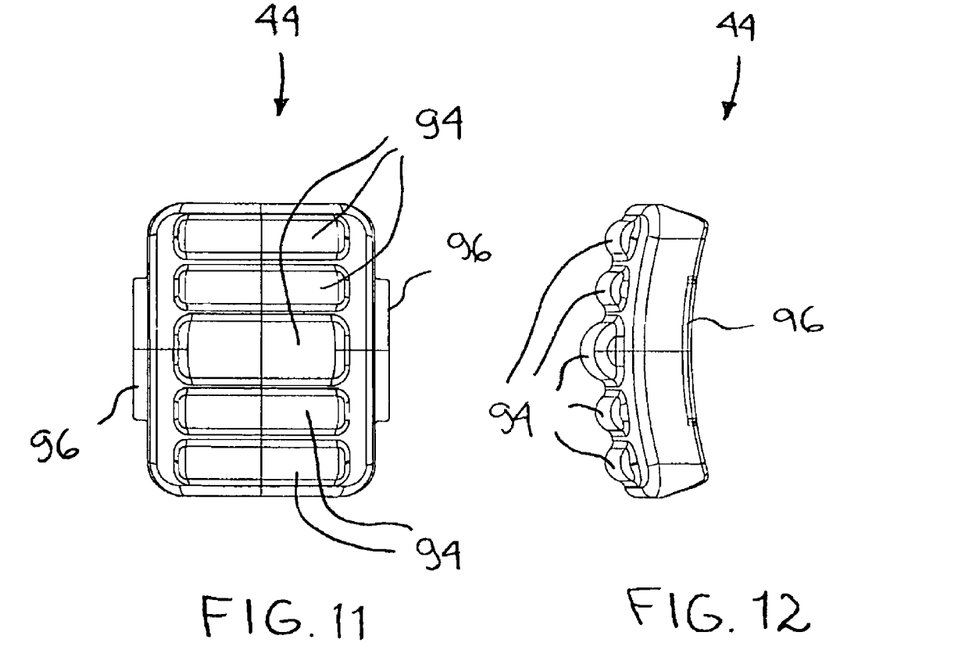
FIG. 11 is an upper plan view of the second cover of FIG. 10.
FIG. 12 is a side elevation view of the second cover of FIG. 10.

FIG. 10 is an isometric view showing one of the second covers 44 of the device 20 in FIG. 1. FIG. 11 is an upper plan view of the second cover 44 shown in FIG. 10. FIG. 12 is a side elevation view of the second cover 44 shown in FIG. 10. As aforesaid, the second cover 44 is in sliding engagement over its corresponding second portion 36 and is freely movable upon actuation by the animal being fed.

As can be seen from FIGS. 10 to 12, the illustrated second cover 44 has a generally rectangular shape and a symmetric design with reference to a longitudinally-extending medial axis. The second cover 44 has an arcuate shape along both its major axis and its minor axis. It also comprises five parallel projections 94 on the upper surface thereof. The central projection 94 is larger in size than the other ones in the illustrated example. Other designs and configurations are also possible.

The second cover 44 includes two opposite side flanges 96, each projecting from a respective major side thereof. As best shown in FIG. 12, the flanges 96 have an arcuate shape. These side flanges 96 are designed to engage the corresponding arcuate slots 46 provided inside the second portions 36.

In use, the caretaker of the domesticated animal inserts food in at least some of the food compartments of the device 20. If desired, the device 20 can be designed with enough capacity to receive the daily ration of food in a single serving. Large animals, however, may require that additional food be loaded one or a few more times.

Various forms of food can be provided in the device 20. For instance, the food can be granular food, paste food, etc. Different kinds and forms of food can be used at the same time. The caretaker can load food with or without the first cover 24. However, it is generally easier to remove it for loading food. The second covers 44 can also be removed to load food, if desired.

Once the food is in place, the device is present to the animal. The animal then has the challenge of finding the food and gaining access to it by overcoming the two different obstacle configurations. This can thus force the animal to slow down the ingestion of food compared to a classic bowl or the like. Also, the relative small size of the various food compartments 38, 40, and 48, when compared to a classic bowl or the like, may offer another form of challenge to the animal since it has to work harder to retrieve the food. Eating more slowly has many benefits for the animal. The animal can also reach the point of satiety without eating too much food. The challenges presented to the animal help it to be mentally stimulated and feel rewarded when a portion of the food is found as the animal move one of the covers 24, 44 of the device 20.

As aforesaid, some domesticated animals may have a tendency of eating less than what they need because of lack of challenge at the time of their meal. The device 20 can thus be used to positively reinforce the animal. By feeling rewarded, some animals may find the motivation to eat all the food they need. Overall, animals using the device 20 can thus be fed and stimulated at the same time.

Figure 13:
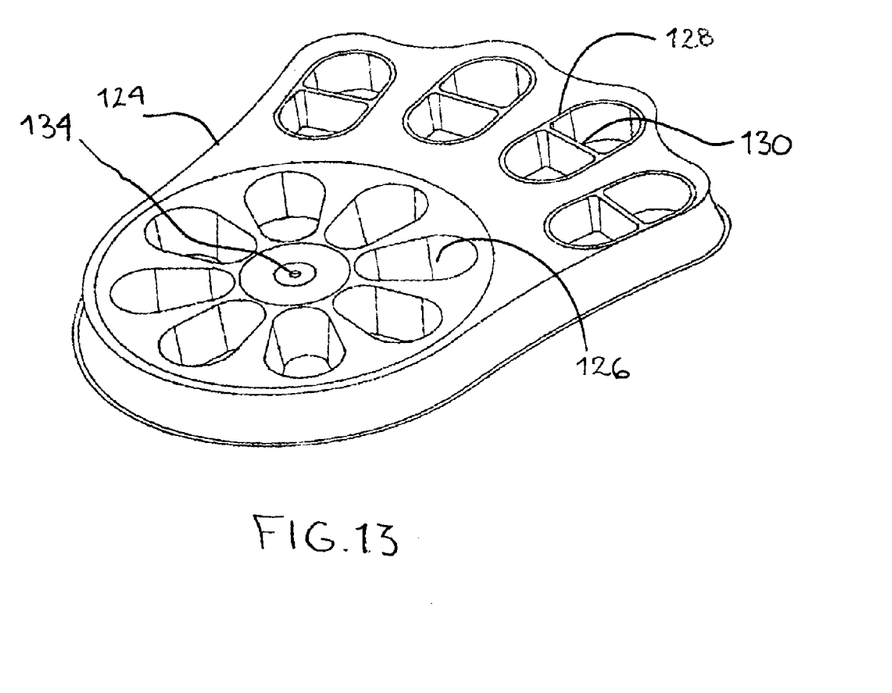
FIG. 13 is an isometric view showing another example of the device, the device being shown without its first cover.
Figure 14:
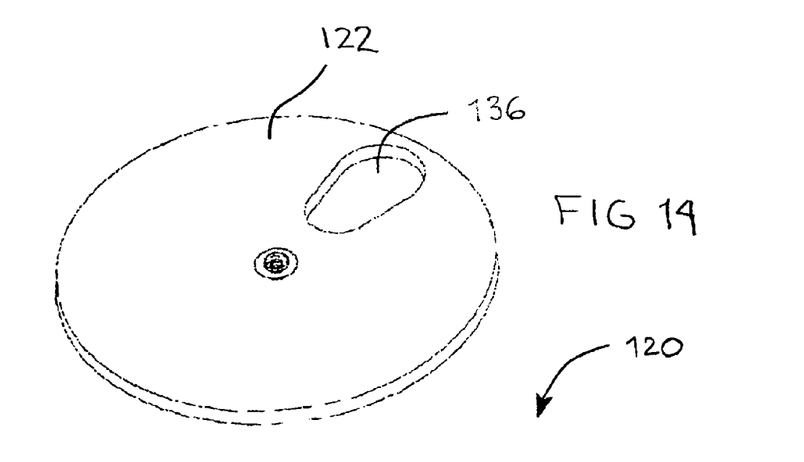
FIG. 14 is an isometric view of the first cover of the device shown in FIG. 13.
Figure 15:
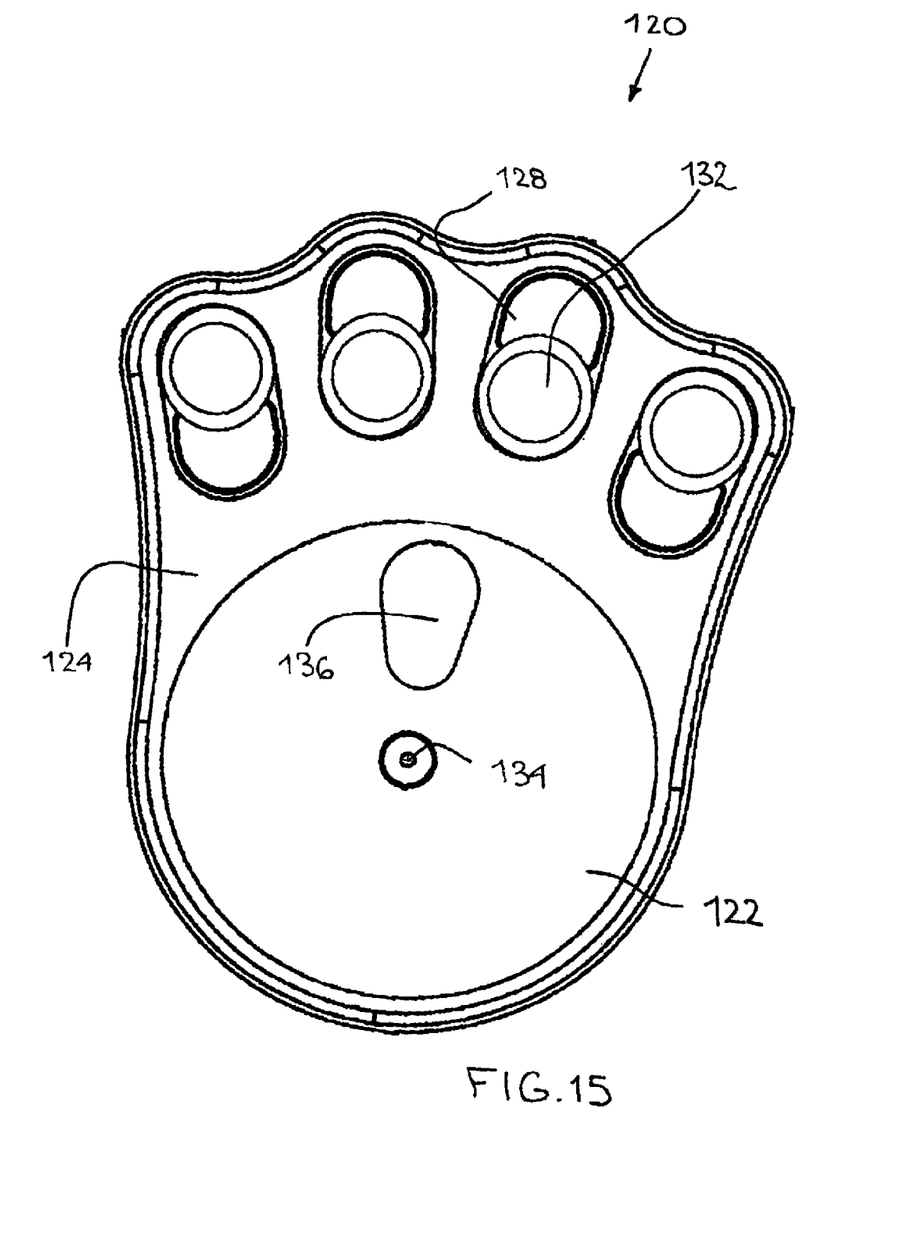
FIG. 15 is an upper plan view of the device of FIG. 13 with the first cover shown in FIG. 14.

FIG. 13 is an isometric view showing another example of the device. This device example is referred to using reference numeral 120. The device 120 is shown without its first cover 122. The first cover 122 of the device 120 is shown in FIG. 14, which figure is an isometric view thereof. FIG. 15 is an upper plan view of the device 120 with its first cover 122. The device 120 forms a combination pet food bowl and activity center. It comprises a main body 124 having a plurality of compartments divided into radial compartments 126 and split compartments 128. The split compartments 128 are characterized by the fact that they have a partition 130 which subdivides each split compartment 128 into at least two sub compartments. A sliding cover or lid 132 on each split compartment 128 provides a significant access to only one subdivision on any given split compartment 128.

The first cover 122 is configured and disposed for rotating around a vertical axis 134. The first cover 122 extends over all of the radial compartments 126. An opening 136 provides full access to only one radial compartment 126 at a time. In use, the device 120 forces the animal to interact with the sliding cover 132 or the rotating cover 122 in order to access food or other treats. This device 120 is simple to use and provides an interactive game for an animal such as pets.

The concept presented herein provides a method for simultaneously feeding and stimulating a domesticated animal. The method comprises placing food in at least one of several first food compartments disposed in circle. Food is also placed in at least one a several second food compartments located adjacent to the first food compartments. At least a major part of the food in the first food compartments is hidden using a rotatable cover and at least some of the food in the second food compartments is hidden using slidable covers. The first and second food compartments are then presented to the domesticated animal. The animal moves the rotatable cover and the sliding covers itself to gain access to only some of the first and second food compartments at a time.

The method also comprises placing some food in a first food-receiving portion of the device, the first portion requiring the animal to rotate an element to gain access to all the food therein. Food is also placed in a plurality of second food-receiving portions of the device, the second portions requiring the animal to slide elements to gain access to all the food therein. The second portions are adjacent to the first portion of the device.

A method of manufacturing a device for simultaneously feeding and stimulating a domesticated animal is proposed. This method includes forming and assembling components of the device described and/or suggested herein using at least one industrial process. The industrial process can include at least one least one among molding, welding, stamping, gluing, and machining, thermoforming.

The method of manufacturing a device for simultaneously feeding and stimulating a domesticated animal can also include forming a plurality of first food compartments disposed in circle and a plurality of independent second food compartments located adjacent to the first food compartments over a main body of the device. A rotatable cover is also formed for hiding the first food compartments. The rotatable cover has at least one aperture providing only a partial access to the hidden first food compartments. A plurality of slidable covers is formed for hiding a portion of the second food compartments. Once formed, the rotatable cover is mounted for rotation around over the first food compartments and the slidable covers are mounted for translation over a corresponding one of the second food compartments.

The forming of the first and the second food compartments may include a molding operation. Furthermore, the forming of the rotatable cover and/or the forming of the sliding covers may include a molding operation.

Example of a Working Product

An actual commercial model of the device 20 as illustrated in FIGS. 1 to 12 was made. The overall dimensions of the main body 22 were about 63 cm in length, 34 cm in width and 8 cm in height. The model had a maximum capacity of about 1 liter of food. It was designed primarily for pets such as cats and dogs of average size.

In one case, the commercial mode allowed a dog of 6.8 kg to eat its food in about 5 minutes. The same animal was previously eating the same amount of food in about 1 minute when the food was provided in a classic dog bowl.

Overall, the device was found to provide a very wide variety of advantages. Depending on the exact model, configuration and animal using the device, these advantages may include one or more of the following, these advantages being listed below in no particular order:

Increasing the time a domesticated animal takes to eat its meal;
Increasing the amount of food eaten by an animal that was previously absorbing less food than required because a lack of motivation;
Providing a new way of feeding an animal while entertaining it both physically and mentally;
Alleviating undesirable behaviors resulting from unsatisfied food-related basic instincts of an animal;
Mitigating the risks of hyperglycemia after a meal since the animal can eat smaller food portions at a time;
Mitigating the risks of an animal being subjected to digestive problems, vomiting, gases, etc. after its meal;
Assisting in maintaining a healthy weight of an animal.
Alleviating the excessive accumulation of fat since an animal eats its meal more slowly with the device and experiences satiety with less food, thereby preventing the animal from eating more than its actual nutritional requirements;
Alleviating stress and dysfunctional anxiety experienced an animal because of the ludic aspect of the device;
Alleviating bulimia of an animal;
Improving the dexterity of an animal and its capacity of solving stimulating intellectual and physical challenges;
Making an animal more busy at the time of its meal;
Improving the physical health of an animal; and
Making an animal happy.
Other advantages are also provided.

The present detailed description and the appended figures are meant to be exemplary only, and a skilled person will recognize that changes can be made in light of a review of the present disclosure while still remaining within the language of the appended claims.

The invention claimed is:

1. A food dispensing and stimulating device for a domesticated animal, the device comprising:
a main body;
a first food-receiving portion provided within an upper side of the main body, the first portion comprising a plurality of independent first food compartments disposed in axi-symmetrical positions with reference to a central vertical axis, each first food compartment having a closed bottom side and an opened upper side;
a first cover positioned over the first portion and supported for free rotation with reference to the vertical axis of the first portion upon actuation by the animal being fed, the first cover including a wall having at least one access aperture;
a plurality of independent second food-receiving portions provided within the upper side of the main body adjacent to the first portion, each second portion comprising two second food compartments separated from one another by a transversal wall, each second food compartment having a closed bottom side and an opened upper side; and
a plurality of second covers, each second cover positioned over a corresponding one of the second portions and freely slidable upon actuation by the animal being fed between a first position where one of the second food compartments is substantially entirely covered, and a second position where the other of the second food compartments is substantially entirely covered.

2. The device as claimed in claim 1, characterized in that the first cover has a generally circular periphery.

3. The device as claimed in claim 1, characterized in that the first food compartments are identical in size and shape.

4. The device as claimed in claim 3, characterized in that the at least one access aperture of the first cover has an inner periphery that substantially corresponds in size and shape to an inner periphery of each first food compartment at their opened upper side.

5. The device as claimed in claim 1, characterized in that the first cover has a single access aperture.

6. The device as claimed in claim 1, characterized in that each of the second portions has a generally rectangular periphery at its opened upper side.

7. The device as claimed in claim 1, characterized in that the second portions are identical in size and shape.

8. The device as claimed in claim 1, characterized in that the first cover comprises a plurality of upper surface projections, the upper surface projections facilitating the actuation of the first cover by the animal.

9. The device as claimed in claim 1, characterized in that at least some of the second covers comprise a plurality of upper surface projections, the upper surface projections facilitating the actuation of the corresponding second covers by the animal.

10. The device as claimed in claim 1, characterized in that the second covers are independently movable along a vertically arcuate path.

11. The device as claimed in claim 1, characterized in that the second portions are disposed substantially parallel to one another.

12. The device as claimed in claim 1, characterized in that the first cover is removably connected to the first portion.

13. The device as claimed in claim 12, characterized in that the device comprises a restraining arrangement between the first cover and the first portion, the restraining arrangement limiting a removal of the first cover from the device.

14. The device as claimed in claim 13, characterized in that the restraining arrangement includes two vertically spaced-apart and angularly offset keyways disposed about the central vertical axis of the first portion, the keyways cooperating with a corresponding side protrusion provided on an axle projecting underneath the first cover.

15. The device as claimed in claim 1, characterized in that the main body, the first portion and the second portions form a monolithic one-piece unit.

16. The device as claimed in claim 15, characterized in that the main body, the first portion and the second portions are made of molded plastic.

17. A method for simultaneously feeding and stimulating a domesticated animal using the device as claimed in claim 1.

18. A method of manufacturing a device for simultaneously feeding and stimulating a domesticated animal, the method comprising forming and assembling components of the device as claimed in claim 1 using at least one industrial process.

19. The method as claimed in claim 18, characterized in that the at least one industrial process includes at least one among molding, welding, stamping, gluing, machining, and thermoforming.

20. A combination pet food bowl and activity center comprising:
- a body having a plurality of compartments divided into radial compartments and split compartments;
- the split compartments being characterized by having a partition subdividing each split compartment into at least two sub compartments;
- a sliding cover on each split compartment to allow for partial access to only one subdivision on any given split compartment;
- a rotating cover rotating around an axis to cover all of the radial compartments; and
- an opening allowing access to one radial compartment at a time.

* * * * *